(12) United States Patent
Åkerström et al.

(10) Patent No.: US 7,319,401 B2
(45) Date of Patent: Jan. 15, 2008

(54) RADAR LEVEL GAUGE SYSTEM WITH VARIABLE ALARM LIMITS

(75) Inventors: Tomas Åkerström, Västra Frölunda (SE); Anders Welin, Torslanda (SE)

(73) Assignee: Rosemount Tank Radar AB, Gothenburg (SE)

( * ) Notice: Subject to any disclaimer, the term of this patent is extended or adjusted under 35 U.S.C. 154(b) by 344 days.

(21) Appl. No.: 10/928,610

(22) Filed: Aug. 27, 2004

(65) Prior Publication Data

US 2006/0044145 A1   Mar. 2, 2006

(51) Int. Cl.
G08B 21/00 (2006.01)

(52) U.S. Cl. ............ 340/612; 340/617; 340/618; 340/621; 342/124; 342/175; 73/1.73; 73/618; 73/629; 73/290 V

(58) Field of Classification Search ........... 340/612, 340/621, 617, 618; 73/290 V, 1.73, 618, 73/629; 342/124, 175
See application file for complete search history.

(56) References Cited

U.S. PATENT DOCUMENTS

| | | | |
|---|---|---|---|
| 4,221,004 A | 9/1980 | Combs et al. | 367/114 |
| 4,700,569 A * | 10/1987 | Michalski et al. | 73/290 V |
| 4,890,266 A * | 12/1989 | Woodward | 367/99 |
| 5,253,511 A | 10/1993 | Jaramillo et al. | 73/1 R |
| 5,305,237 A | 4/1994 | Dalrymple et al. | 364/562 |
| 5,649,450 A | 7/1997 | Glab et al. | 73/307 |
| 6,047,598 A | 4/2000 | Otto et al. | 73/290 V |
| 6,414,625 B1 | 7/2002 | Kleman | 342/124 |
| 6,634,234 B1 * | 10/2003 | Haas | 73/618 |
| 6,679,115 B2 * | 1/2004 | Heidecke | 73/290 V |
| 6,765,524 B2 | 7/2004 | Kleman | 342/124 |
| 7,095,365 B2 * | 8/2006 | Klofer et al. | 342/124 |
| 2003/0191609 A1 * | 10/2003 | Bernardi et al. | 702/191 |

FOREIGN PATENT DOCUMENTS

| | | | |
|---|---|---|---|
| GB | 2350004 A | 11/2000 | |
| WO | WO 03/025523 A1 | 3/2003 | |
| WO | 2004018978 A1 | 3/2004 | 23/284 |
| WO | WO 2004/018978 | 3/2004 | |

* cited by examiner

*Primary Examiner*—Tai Nguyen
(74) *Attorney, Agent, or Firm*—Westman, Champlin & Kelly, P.A.

(57) ABSTRACT

A radar level gauge system for determining the filling level of a filling material in a tank is disclosed. The system comprises a transmitter for transmitting measuring signals towards the surface of the filling material; a receiver for receiving echo signals from the tank; processing circuitry for determining the filling level of the tank based on said echo signal and adapted to compare said determined filling level with at least one preset threshold value and to produce an alarm signal in dependence of said threshold value; and a storage means for storing the preset threshold value, wherein said threshold value in said storage means is replaceable and/or adjustable. The alarm signal could indicate high level and/or overfill. The possibility of adjusting/replacing the threshold values enables adjustment of the alarm levels when the system is already installed.

A corresponding method of operation is also disclosed.

17 Claims, 1 Drawing Sheet

RADAR LEVEL GAUGE SYSTEM WITH VARIABLE ALARM LIMITS

FIELD OF THE INVENTION

The present invention relates to a radar level gauge system for determining the filling level of a filling material in a tank, comprising an antenna device for emitting measuring signals towards the surface of the filling material; a receiver device for receiving echo signals from the tank; and processing circuitry for determining the filling level of the tank based on said echo signal. More specifically the invention relates to a radar level gauge system of the type producing an alarm when the determined filling level fulfills certain preset conditions. Further, the invention also relates to a corresponding method for determining the filling level of a filling material in a tank.

BACKGROUND OF THE INVENTION

A great variety of level gauge systems are known in the art, and for many different applications. For some applications it is requested that an alarm is issued when the filling level exceeds a certain limit. For reasons of security, in a container, in almost all cases, a cargo which requires a closed gauging device also requires at least one of a high level alarm and an overfill control. Such safety systems are e.g. often mandatory on e.g. tankers. According to safety rules the high level and/or overfill alarm system must normally function independently of an ordinary level gauge system for measuring at all levels. A fault of one system must not render the other system(s) inoperative.

The systems producing alarms are conventionally realized as mechanical systems, including a float member which is mechanically connected to a detector. An example of such a system is e.g. disclosed in U.S. Pat. No. 5,649,450. However, such mechanical systems are the subject of many problems. For example, the environment in the tanks is often relatively rough, making the movable mechanical parts likely to malfunction over time. Further, the floating member needs to be in contact with the fluid, which is disadvantageous since the surfaces normally not calm in use. Accordingly, these mechanical system have problems with robustness, accuracy and reliability.

Still another disadvantage of a fixedly mounted float detector is its inability to adjust the alarming level for tank inclinations, should the device not be located in the tank center.

Further it is known to use non-contacting level gauge systems, such as radar level gauges. These devices utilize antennas to transmit electromagnetic waves toward the material being monitored and to receive electromagnetic echoes which are reflected at the surface of the material being monitored. Such systems could either use continuous transmitted signals, so-called FMWC (frequency modulated continuous wave) or pulsed transmitted signals. Examples of such radar level gauge systems are e.g. disclosed in WO 2004/018978 and U.S. Pat. No. 6,414,625.

A common problem in alarm level gauge systems is that in the design stage of a tank, the maximum volume allowed in the tank is conventionally estimated and decided by a third party beforehand. This maximum volume is not to be exceeded when the tank is set in operation. Also, the operator/class normally requires a warning on a volume close to the maximum allowed volume to simplify the operation when loading the tank, which is usually referred to as "high level". Accordingly, the alarm level gauge system is designed according to this estimated and predetermined information, and arranged in the tank. Thereafter, during commissioning, the tank is inspected and often enough the inspector allows the tank to hold a greater volume than initially stated during the design stage, which puts the tank owner in a dilemma; either the level gauge system must, which is typically mechanically fixed, be replaced or modified, which is normally a tedious, cumbersome and expensive operation, or the less than optimal tank volume has to be accepted, which means that the full storage capacity could not be used. Both options cost a lot of money for the customer in terms of inefficiency in use and/or delayed projects and longer time in port for the tankers.

There is therefore a need for a more effective alarm level gauge system.

SUMMARY OF THE INVENTION

It is therefore an object of the present invention to provide a radar level gauge system and a method of determining the filling level of a filling material, which at least partly alleviate the above-discussed problems of the prior art.

This object is achieved with a radar level gauge system and a method according to the appended claims.

According to a first aspect of the invention, there is provided a radar level gauge system for continuously determining the filling level of a filling material in a tank, comprising: a transmitter for transmitting measuring signals towards the surface of the filling material; a receiver for receiving echo signals from said surface; processing circuitry for determining the filling level of the tank based on said echo signal and adapted to compare said determined filling level with at least one preset threshold value and to produce an alarm signal in dependence of said threshold value; and a storage means for storing the preset threshold value, wherein the storage means is controllable, whereby the threshold value stored in said storage means is operator adjustable.

A system for continuously determining a filling level is in this application recognized as a system which in use provides updated information on the filling level relatively often in the light of the expected variations of the filling level. Continuously would for most applications mean at least once every second, i.e. with a frequency exceeding 1 Hz.

A controllable storage means enabling adjustment of the threshold value by the operator is recognized as any storage means in which a stored threshold value could be modified, selected, replaced and/or in any other way controlled by the operator after the initial configuration.

The alarm radar level gauge system of the present invention provides a new type of alarm system, particularly for high level and/or overfill alarms, that enables adjustment of the threshold for the alarm levels when the system and/or sensor is already installed. For example, the system also enables automatic adjustment of the alarm limit and monitored level in real time as the trim and list of the ship changes during loading and off-loading to improve the capacity utilization and enable true volume fill correspondence independent of gauge/sensor location. It is estimated that by means of the invention the capacity of e.g. LNG (Liquefied Natural Gas) carriers could be increased by 0.2%.

Further, the non-contact system of the invention could easily be made very robust, accurate and reliable. Therefore, the ship operator would not need to walk out to all tanks and manually test the function of the float prior to entering a port, as is normally the case today. Further, the inventive system requires significantly less maintenance than e.g. mechanical systems which will improve the users profitability. Through higher reliability, the new system also enables the user to top off the tanks relying on the level system without having to manually go out to the tank and hand measure thereby improving operating performance, efficiency and productivity. Providing such a reliable alarm system also enables the operator to load at higher speed, whereby the turn around time in port could be decreased which increases efficiency, competitiveness and productivity for the ship operator.

Since the alarm limit can be adjusted on site, the new alarm limit can be set without replacing or modifying the installed hardware. Thus, the invention give advantages to the customer in terms of no waiting for re-building or modification of the measuring device, and a possibility to utilize the tank for its maximum allowed volume. It is further a great advantage that the alarm could be triggered at a monitored level that has first been corrected for any ship/tank inclination, especially if the gauging device is located at any other point than at the tank center. This enable true volume fill correspondence for the alarming.

The inventive system is particularly useful for tanks containing inflammables, gases, fuels and the like. Further, it is particularly useful for tanks arranged on movable vehicles, such as ships and tankers. However, it should be appreciated by persons skilled in the art that the invention is also useable for other purposes and applications.

Further, the inventive alarm system is preferably a system dedicated to provide alarm(s) upon certain determined condition(s), and to be separated and independent from any level gauge system for providing information on the filling level at all levels. However, it should be appreciated by those versed in the art that the inventive system could also be integrated in such a system, should the regulations and application permit such an integrated system.

The gauge system preferably comprises a conducting signal guiding medium for guiding said measuring signal towards the surface in the tank and for guiding the echo signal away from said surface. Such a probe does not require free sight, but only the space necessary for the probe. Consequently, such a system is well suited to be used in for example tanks arranged in tankers.

The gauge system could further comprise an alarm, which is activated by said alarm signal. The alarm could e.g. be arranged in a control unit for the system. The alarm system may be distributed, whereby the alarm could be arranged at a distance from the gauge system. Alternatively, the alarm signal could be sent to a separate system, such as to a general control system. The alarm signal may additionally or alternatively be used for controlling the gauge system or other control systems related to the tank in accordance with an alarm protocol or alarm scheme. For example, the alarm signal may be used for automatically stopping the loading of the tank, for automatically turning off the level gauge system, or the like.

The alarm signal produced in dependence of the threshold value preferably corresponds to at least one of a high level alarm and an overfill alarm. The limits for these types of alarms are often regulated, and typically the limit for high level corresponds to about 95% of the tank volume and the limit for over fill to about 98% of the tank volume.

The system could also comprise a data input means for inputting data for replacing or adjusting the threshold value in the storage means. The data input means could be a data input interface to be connected to an extern control unit or to a portable device such as a handheld computer. Alternatively, the data input means could comprise stationary input equipment, such as a keyboard, a touch screen or the like.

The input means is preferably adapted to enable authorization and/or authentication control of input data. For example, the input means may request a password or similar authentication tokens in order to permit modification of the stored threshold data. The authorization and/or authentication control of the input data provides protection against erroneous or unauthorized manipulation of the system.

The input means could, as an alternative or in addition, be adapted to require confirmation by the operator on input data before adjusting the threshold value in the storage means. For example, the operator could be presented with a question such as "Do you really want to use this value as a new alarm limit?" or the like, whereby the adjustment is only executed upon a confirmative response. Further, the input means could be adapted to output confirmation data regarding the input data to the operator. This could e.g. be enabled by means of a message produced on a display, an audible message or the like. The input means could also be adapted to automatically confirm that the adjusted threshold value is reasonable before adjusting the threshold value in the storage means. Such a test for reasonability could e.g. be to confirm that the new value is within a certain range within which the threshold value must or is likely to reside, to confirm that the new value contains a predetermined number of digits, and the like. All the above measures could be used independently or in different combinations, in order to increase the security of the system, and avoid the risk of human errors and the like.

The input means is further preferably connectable to a measurement device for measuring tank inclination, for inputting current tank or ship inclination, e.g. from an inclinometer or other devices capable of measuring, calculating or estimating the inclination of the tank in question, in order to generate to trim and list corrections to be used for the alarm levels.

The processing circuitry is preferably adapted to produce an alarm signal when the determined filling level, preferably a monitored trim and list corrected level as discussed in the foregoing, exceeds a first threshold value. The first threshold value may be the only threshold value, or one of several different stored threshold values. An activated alarm signal could be deactivate as soon as the determined filling level is again lower than the first threshold value. However, it is also possible to provide a second threshold value and deactivate the produced alarm signal when the determined filling level is lower than said second threshold value, said second threshold value corresponding to a lower filling level than said first threshold value. Hereby, the alarm is activated at a higher level than it is deactivated, so-called hysteresis, which makes the system more stable. In addition or as an alternative, it is also possible to delay the activation of the alarm for a certain time period, i.e. only to produce the alarm signal when the determined filling level exceeds a first threshold value during a predetermined time period. Such a measure also makes the system more stable.

In addition, or alternatively, the processing circuitry could be adapted to produce an estimated time-to-alarm signal indicating a prediction of the time left until the determined filling level will exceed the first threshold value. This signal could be calculated from the tank level rate, the determined filling level, etc, and could be presented to the operator in terms of minutes/seconds left to expected alarm point.

The processing circuitry may further be adapted to produce an alarm signal when a system fault condition is detected. Hereby, a smart, self-diagnosing system could be provided, in which the system by itself could detect one or several different possible fault conditions, and produce an alarm when such a fault occurs. For example, an alarm may be produced when the amplitude of the echo signals, for normal non-alarming levels, diminishes under a certain value, when communication errors between different components within the system are detected, etc. Further, check-ups of various components of the system may be performed in order to identify possible defects.

The gauge system could use a transmitter emitting continuous signals, wherein the processing circuitry is adapted to determine the filling level based on a phase difference between the received echo signal and a reference signal, as so-called FMWC system. Alternatively, the pulsed signals may be used, wherein the processing circuitry is adapted to determine the filling level based on the time between the emission of a pulsed signal and the reception of the echo of said signal. The pulse in a pulsed radar level gauge system can be modulated by a carrier frequency (typically 6 or 24 GHz), or be an unmodulated DC pulse. In the former case an antenna is used to emit the wave into the tank, where it propagates through the tank contents. In the latter case, the antenna is replaced with a transmission line (probe) that guides the electromagnetic pulse in the tank.

According to another aspect of the invention, there is provided a method of continuously determining the filling level of a filling material in a tank, comprising: transmitting measuring signals towards the surface of the filling material; receiving echo signals from said surface; determining the filling level of the tank based on said received echo signals; storing at least one preset threshold value; and producing an alarm signal in dependence of said determined filling level and said threshold value; wherein the preset threshold value is replaceable and/or adjustable. It is recognized that the adjustment could involve modification, selection, replacement and/or any other way of control of the threshold value after the initial configuration. The steps could be executed in different order, and e.g. the adjustment could take place before, in between and/or after the other steps.

This method could be used for operating the previously discussed radar level gauge system, and provides the same or similar advantages.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIG. 2 is a schematic diagram illustrating the activation of the alarm as a function of the determined filling level, wherein

DESCRIPTION OF PREFERRED EMBODIMENTS

Figure 1:
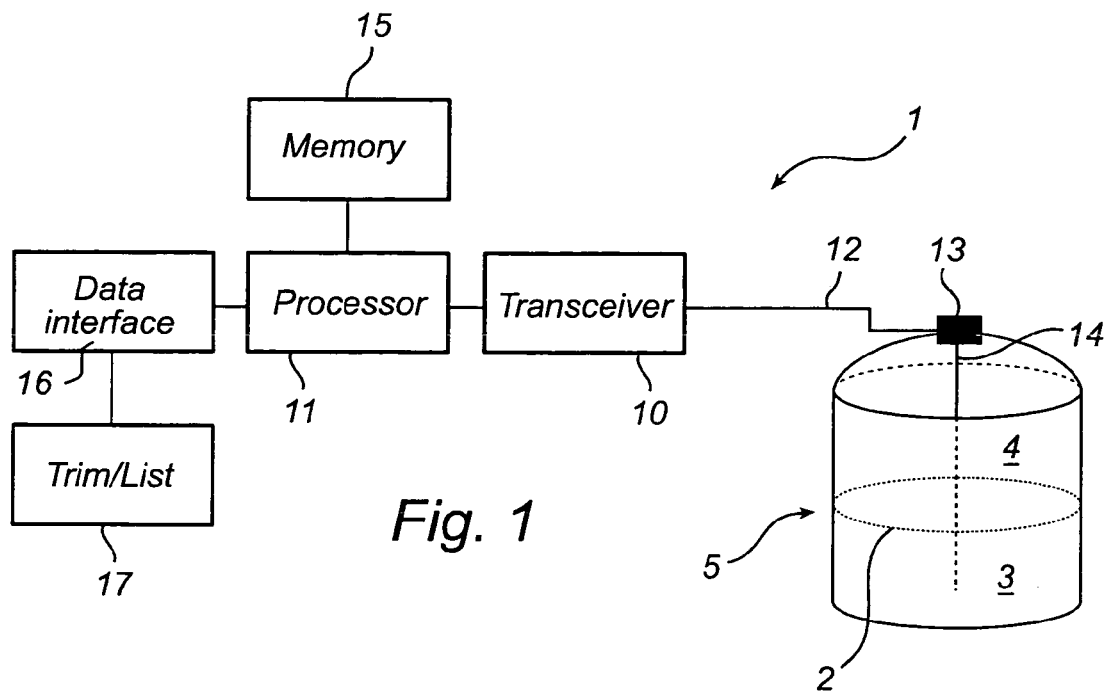
FIG. 1 is a schematic cross-sectional side view of a container, in which an antenna device according to the embodiment is arranged.

FIG. 1 shows schematically a radar level gauge system 1 in which the invention may be advantageously incorporated. The system 1 is arranged to perform measurements of a filling level in the tank, i.e. the level of an interface 2 between two materials 3, 4 in a tank 5. Typically, the first material 3 is a liquid stored in the tank, e.g. gasoline or a liquefied gas, while the second material 4 is air or vapor, e.g. inert gas. The tank is typically arranged on a moving vehicle, such as on a tanker.

In an examplary embodiment, the system in FIG. 1 comprises an electronic unit for transmitting and receiving radar signals and processing the received signals in order to determine the level in the tank, such as a transceiver 10, controlled by a processor 11 to transmit electromagnetic signals over a signal guiding medium 12 to the tank 5. The system may use pulsed or continuously emitted radiation. In case pulsed signals are used, the signals can be DC pulses with a length of about 2 ns or less, with a frequency in the order of MHz, at average power levels in the nW or μW area. Alternatively, the pulses are modulated on a carrier wave of a GHz frequency. The signal guiding medium 12 can be any wave guiding structure, such as a hollow wave guide or a coaxial wire. The transceiver may also be directly connected to a connection in the tank, in which case the signal guiding medium 12 simply comprises the connection terminal of the transceiver. If required, the tank is provided with a sealing 13, arranged to allow the electromagnetic signals to pass through he wall of the tank 5 while maintaining an air tight seal, so as to prevent tank contents from escaping from the tank. Inside the tank 5, the electromagnetic signals are emitted towards the surface 2. In the illustrated case, the signals are guided by a probe 14, e.g. a twin wire probe or coaxial probe. Alternatively, the signals could be emitted by a radar antenna, and propagate freely through the tank medium.

In the above-discussed embodiment the microwave is transmitted via a wave guide 12, which communicates with the product. However, the invention can just as well be used for a radar level gauge with a freely propagated beam and it could be used for any kind of level gauging, where the level of a product surface is supervised.

After reflection against the surface 2, the electromagnetic signals are again guided by the medium 12 back to the transceiver 10, where they are sampled and digitalized in a process controlled by a processing circuitry, such as a processor 11. The processor is provided with software for analyzing the signal in order to determine a the filling level in the tank, i.e. the level of the surface 2. The processor 11 is preferably a microprocessor based circuit adapted to receive the incoming signal, as discussed above, and provide as an output a signal or information indicative of the level of material 3. The functions and algorithms implemented by signal processor 11, some of which can be embodied in hardware and some of which can be embodied in software, are per se known from the art will not be discussed further in this application.

The system also comprises a storage means, such as a memory 15, for holding at least one threshold value, and being connected to and accessible by the processor. The memory content should be adjustable or replaceable, in order to enable modification of the threshold value(s). The memory could e.g. be a conventional RAM, a flash-memory or the like. Preferably, a non-volatile memory is used.

The system also comprises a data input means for inputting data for replacing or adjusting the threshold value in the memory 15. The data input means could be a data input interface 16 to be connected to an extern control unit or to a portable device such as a handheld computer. Alternatively, the data input means could comprise stationary input equipment, such as a keyboard, a touch screen or the like. The input means could also be adapted to enable authorization and/or authentication control of input data. Such authorization/authentication control could be executed and managed by the processor 11. For example, the input means may request a password or similar authentication tokens in order to permit modification of the stored threshold data.

The input means could further comprise a measurement device 17 for measuring tank inclination or other trim/list data, or be connectable to such a device. Hereby, data regarding e.g. current tank or ship inclination could be automatically input to the processor. The measuring device could e.g. be an inclinometer or other devices capable of measuring, calculating or estimating the inclination of the tank in question, in order to generate to trim and list corrections to be used for the alarm levels.

The processor is further adapted, preferably by means of software control, to compare the determined filling level and the stored threshold value(s), and to produce an alarm signal in dependence of said comparison. The threshold values are preferably chosen to generate alarms concerning at least one of a high level alarm and an overfill alarm. The limit for high level typically corresponds to about 95% of the tank volume and the limit for over fill typically to about 98% of the tank volume.

The processing circuitry is preferably adapted to produce an alarm signal when the determined filling level exceeds a first threshold value. An activated alarm signal could be deactivate as soon as the determined filling level is again lower than the first threshold value.

Figure 2A:
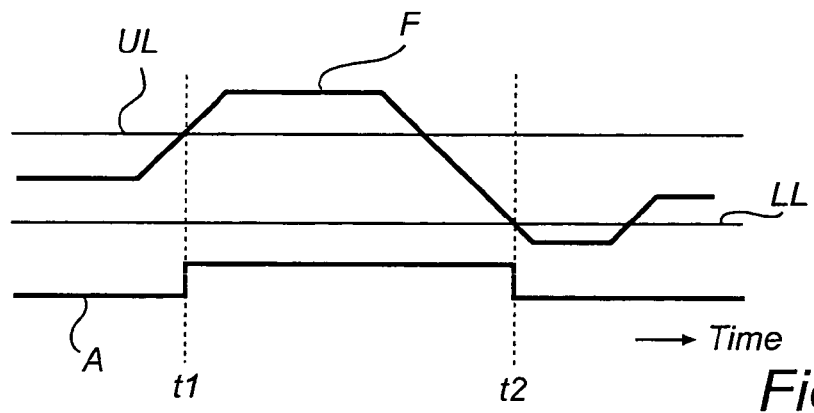
FIG. 2a illustrates an operating condition in which hysteresis is used.

However, it is also possible to provide a second threshold value and deactivate the produced alarm signal when the determined filling level is lower than said second threshold value, said second threshold value corresponding to a lower filling level than said first threshold value, as is illustrated in FIG. 2a. In the example in FIG. 2a, a signal F corresponding to the determined filling level is compared with an upper alarm limit UL. When the filling level exceeds the upper limit, at time t1, an alarm is activated. This could be performed by switching an output alarm signal A from an OFF-state to an ON-state. After activation, the filling level signal F is compared with a lower alarm limit LL. When the filling level becomes lower than said lower limit, at time t2, the alarm is deactivated. This could be performed by returning the output alarm signal A from the ON-state to the OFF-state. Hereby, the alarm is activated at a higher level than it is deactivated, so-called hysteresis, which makes the system more stable.

Figure 2B:
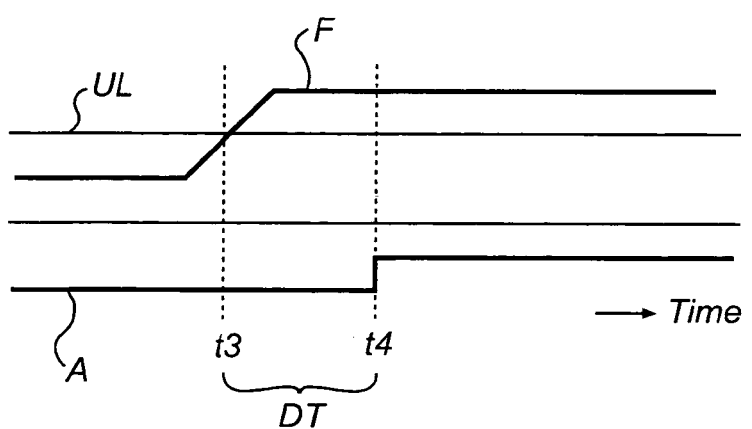
FIG. 2b illustrates an operating condition in which delayed activation is used.

In addition or as an alternative, it is also possible to delay the activation of the alarm for a certain time period, i.e. only to produce the alarm signal when the determined filling level exceeds a first threshold value during a predetermined time period, as is illustrated in FIG. 2b. In the example in FIG. 2b, the signal F corresponding to the determined filling level is compared with the upper alarm limit UL. When the filling level exceeds the upper limit, at time t3, the signal is monitored during a delay time DT. If the signal F remains above the upper limit UL during the entire delay time DT, the alarm is activated, at time t4. This could be performed by switching the output alarm signal A from an OFF-state to an ON-state. However, should the signal fall below the upper limit UL during the delay period DT, the activation is immediately aborted, and should the filling level F once again exceed the upper limit UL, a new delay period is initiated.

The gauge system could further comprise an alarm (not shown), which is activated by said alarm signal. The alarm could e.g. be arranged in a control unit for the system. The alarm system may be distributed, whereby the alarm could be arranged at a distance from the gauge system. Alternatively, the alarm signal could be sent to a separate system, such as to a general control system. The alarm may be arranged close to the measuring equipment, or at a remote location (for example in a control room), wherein the alarm signals could be transferred via a signal wire or the like. The alarming unit can be designed in several ways to alert an operator about the current situation. As some examples: an acoustic signal can be activated, alarming lamps can start to light or twinkle or some kind of signaling can be activated on a control board, alarms on a computer screen or a remote unit (phone, minicall, radio, etc.) could be activated, etc.

The processing circuitry may further be adapted to produce an alarm signal when a system fault condition is detected. Hereby, a smart, self-diagnosing system could be provided, in which the system by itself could detect one or several different possible fault conditions, and produce an alarm when such a fault occurs. For example, an alarm may be produced when the amplitude of the echo signals diminishes under a certain value, when communication errors between different components within the system are detected, etc. Further, check-ups of various components of the system may be performed in order to identify possible defects.

With the present invention, the possibility to modify the threshold value(s) makes the level gauge system much more flexible than heretofore known systems, which makes the installation process easier and more efficient, and enables a more effective use of the storage capacity of the tank. This has proven remarkably efficient, and is specifically advantageous for LNG tankers and the like.

Specific embodiments of the invention have now been described. However, several alternatives are possible, as would be apparent for someone skilled in the art. For example, many different components may be used for performing the various functions of the level gauge system and the processing circuitry, as would be readily apparent for someone skilled in the art. Further, many different types of threshold values and alarm parameters may be used within the system as outlined above, the system may use pulsed or continuously transmitted measuring signals, the system may be a dedicated alarm system, or integrated in an conventional measuring system, etc. Such and other obvious modifications must be considered to be within the scope of the present invention, as it is defined by the appended claims.

What is claimed is:

1. A radar level gauge system for continuously determining a filling level of a filling material in a tank, comprising:
   a transmitter for transmitting measuring signals towards a surface of the filling material;
   a receiver for receiving echo signals from said surface;
   processing circuitry for determining the filling level of the tank based on said echo signal and adapted to compare said determined filling level with at least one preset threshold value and to produce an alarm signal in dependence of said threshold value; and
   a storage means for storing the preset threshold value, wherein the storage means is controllable, whereby the threshold value stored in said storage means is operator adjustable, wherein the processing circuitry is adapted to produce an alarm signal when the determined filling level exceeds a first threshold value and wherein the processing circuitry is adapted to deactivate a produced alarm signal when the determined filling level is lower than a second threshold value, said second threshold value corresponding to a lower filling level than said first threshold value.

2. The gauge system of claim 1, further comprising a conductive signal guiding medium for guiding said measuring signal towards the surface in the tank and for guiding the echo signal away from said surface.

3. The gauge system of claim 1, further comprising an alarm, which is activated by said alarm signal.

4. The gauge system of claim 1, wherein the alarm signal produced in dependence of the threshold value corresponds to at least one of a high level alarm and an overfill alarm.

5. The gauge system of claim 1, further comprising a data input means for inputting data for adjusting the threshold value in the storage means.

6. The gauge system of claim 5, wherein the input means is adapted to enable at least one of authorization and authentication control of input data.

7. The gauge system of claim 5, wherein the input means is adapted to require confirmation by the operator on input data before adjusting the threshold value in the storage means.

8. The gauge system of claim 5, wherein the input means is adapted to output confirmation data regarding the input data to the operator.

9. The gauge system of claim 5, wherein the input means is adapted to automatically confirm that the adjusted threshold value is reasonable before adjusting the threshold value in the storage means.

10. The gauge system of claim 5, wherein the input means is connectable to a measurement device for measuring tank inclination.

11. The gauge system of claim 1, wherein the processing circuitry is adapted to produce the alarm signal when the determined filling level exceeds a first threshold value during a predetermined time period.

12. The gauge system of claim 1, wherein the processing circuitry is adapted to produce an estimated time-to-alarm signal indicating a prediction of the time left until the determined filling level will exceed the first threshold value.

13. The gauge system of claim 1, wherein the processing circuitry is further adapted to produce an alarm signal when a system fault condition is detected.

14. The gauge system of claim 1, wherein the transmitter is adapted to emit continuous signals, and wherein the processing circuitry is adapted to determine the filling level based on a phase difference between the received echo signal and a reference signal.

15. The gauge system of claim 1, wherein the transmitter is adapted to emit pulsed signals, and wherein the processing circuitry is adapted to determine the filling level based on the time between the emission of a pulsed signal and the reception of the echo of said signal.

16. A method of continuously determining a filling level of a filling material in a tank, comprising:

transmitting measuring signals towards a surface of the filling material;

receiving echo signals from said surface;

determining the filling level of the tank based on said received echo signals;

storing at least one preset threshold value;

producing an alarm signal in dependence of said determined filling level and said threshold value; and adjusting the preset threshold value, wherein the alarm signal is produced when the determined filling level exceeds a first threshold value and wherein a produced alarm signal is deactivate when the determined filling level is lower than a second threshold value, said second threshold value corresponding to a lower filling level than said first threshold value.

17. The method of claim 16, wherein the alarm signal is produced when the determined filling level exceeds a first threshold value during a predetermined time period.

* * * * *